United States Patent
Sadri et al.

(10) Patent No.: US 11,537,923 B2
(45) Date of Patent: Dec. 27, 2022

(54) PREDICTIVE METHODOLOGY TO IDENTIFY POTENTIAL UNKNOWN SWEET SPOTS

(71) Applicant: Ford Global Technologies, LLC, Dearborn, MI (US)

(72) Inventors: Hossein Jacob Sadri, Novi, MI (US); Steven Torey, Macomb Township, MI (US); Stephen Juszczyk, Commerce Township, MI (US); Lance David Marsac, South Lyon, MI (US); Sueha Elmir Salame, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 415 days.

(21) Appl. No.: 16/781,310

(22) Filed: Feb. 4, 2020

(65) Prior Publication Data

US 2021/0241154 A1   Aug. 5, 2021

(51) Int. Cl.
*G06N 7/00* (2006.01)
*G06F 16/9035* (2019.01)
*G06N 20/00* (2019.01)

(52) U.S. Cl.
CPC ......... *G06N 7/005* (2013.01); *G06F 16/9035* (2019.01); *G06N 20/00* (2019.01)

(58) Field of Classification Search
CPC .. G06N 3/00–20/00; G06F 1/00–40/00; G06Q 10/00–50/00
USPC .............................. 706/1–900; 705/7.11–7.42
See application file for complete search history.

(56) References Cited

U.S. PATENT DOCUMENTS

| | | | |
|---|---|---|---|
| 5,748,850 A | 5/1998 | Sakurai | |
| 5,890,131 A | 3/1999 | Ebert et al. | |
| 6,029,195 A * | 2/2000 | Herz | H04N 21/25891 348/E7.071 |
| 6,266,649 B1 * | 7/2001 | Linden | G06Q 30/02 705/26.7 |
| 6,430,539 B1 * | 8/2002 | Lazarus | G06Q 30/02 705/14.1 |
| 6,539,392 B1 * | 3/2003 | Rebane | G06Q 30/0601 705/26.1 |

(Continued)

OTHER PUBLICATIONS https://web.archive.org/web/20190224193056/https://en.wikipedia.org/wiki/Linear_search (Year: 2019).*

*Primary Examiner* — Alan S Miller
(74) *Attorney, Agent, or Firm* — Brandon Hicks; Kilpatrick Townsend & Stockton LLP

(57) ABSTRACT

To identify the sweet spot for criteria attributes (i.e., variables) within a complex system, a data source having objectively acceptable values or ranges of values for the criteria attributes for each variant of the system is generated. The identification system used to analyze the complex system to identify the sweet spot receives measurement values from a testing system that measures values of the criteria attributes from variants of the complex system and provides the measurement values to the identification system. The criteria attributes may be prioritized for determination of the sweet spot, including a selection of a value or range of values that are to be used for the most highly prioritized criteria attribute. The prioritized criteria attributes and objectively acceptable values can be used to filter the measurement values to identify the sweet spot for the variants of the complex system.

19 Claims, 6 Drawing Sheets

(56) References Cited

U.S. PATENT DOCUMENTS

| | | | |
|---|---|---|---|
| 6,816,747 B2 | 11/2004 | Mammoser et al. | |
| 6,898,468 B2 | 5/2005 | Ott et al. | |
| 6,973,389 B1* | 12/2005 | Mountassir | G06Q 10/04 702/22 |
| 7,191,143 B2* | 3/2007 | Keli | G06Q 10/06 705/7.32 |
| 7,398,201 B2* | 7/2008 | Marchisio | G06F 40/211 707/E17.084 |
| 7,505,921 B1* | 3/2009 | Lukas | G06Q 30/0633 705/37 |
| 7,523,047 B1* | 4/2009 | Neal | G06Q 30/06 705/7.35 |
| 7,596,505 B2* | 9/2009 | Keil | G06Q 30/02 705/7.32 |
| 7,693,901 B2* | 4/2010 | Ka | G06F 16/951 707/723 |
| 7,716,225 B1* | 5/2010 | Dean | G06F 16/9535 707/751 |
| 7,836,057 B1* | 11/2010 | Micaelian | G06F 16/9535 707/750 |
| 7,966,219 B1* | 6/2011 | Singh | G06Q 30/0631 705/26.7 |
| 8,078,489 B1* | 12/2011 | Marsten | G06Q 10/04 705/7.25 |
| 8,126,881 B1* | 2/2012 | Sethi | G06F 16/24578 707/723 |
| 8,244,673 B2 | 8/2012 | Icho et al. | |
| 8,326,845 B2* | 12/2012 | Sethi | G06F 16/907 707/751 |
| 8,352,399 B2 | 1/2013 | Bluvband et al. | |
| 8,375,037 B2* | 2/2013 | Sethi | G06F 16/2465 707/751 |
| 8,498,889 B1* | 7/2013 | Marsten | G06Q 30/0621 705/7.25 |
| 8,600,823 B1* | 12/2013 | Raines | G06Q 40/04 705/26.1 |
| 8,620,717 B1* | 12/2013 | Micaelian | G06Q 30/0206 705/7.29 |
| 8,868,572 B2* | 10/2014 | Sethi | G06F 16/24578 707/751 |
| 8,954,424 B2* | 2/2015 | Gupta | G06F 16/3334 707/723 |
| 9,275,367 B2 | 3/2016 | Neway | |
| 9,324,104 B1* | 4/2016 | Levy | G06F 16/9535 |
| 9,465,873 B1* | 10/2016 | Franke | G06Q 30/0206 |
| 9,581,726 B2* | 2/2017 | Rangarajan | G06K 9/6228 |
| 10,572,555 B1* | 2/2020 | Franke | G06Q 30/0201 |
| 2003/0023385 A1 | 1/2003 | Lazaridis | |
| 2003/0040952 A1* | 2/2003 | Keil | G06Q 30/02 705/5 |
| 2003/0088457 A1* | 5/2003 | Keil | G06Q 30/02 705/7.32 |
| 2005/0108094 A1* | 5/2005 | Hugron | G06Q 30/02 705/14.44 |
| 2005/0159936 A1* | 7/2005 | Rees | G06F 30/00 703/6 |
| 2005/0261953 A1* | 11/2005 | Malek | G06Q 30/02 705/7.32 |
| 2006/0026081 A1* | 2/2006 | Keil | G06Q 30/02 705/7.32 |
| 2006/0041465 A1* | 2/2006 | Woehler | G06Q 10/087 705/7.31 |
| 2006/0064288 A1* | 3/2006 | Ferryanto | G06Q 10/00 703/2 |
| 2006/0218162 A1* | 9/2006 | Keil | G06F 30/00 |
| 2007/0073429 A1* | 3/2007 | Rees | G06F 30/17 700/97 |
| 2008/0126149 A1* | 5/2008 | Kloess | G06Q 10/00 705/7.41 |
| 2008/0215349 A1* | 9/2008 | Baran | G06Q 10/10 705/1.1 |
| 2008/0222010 A1* | 9/2008 | Hudak | G06Q 30/02 705/27.1 |
| 2011/0055207 A1* | 3/2011 | Schorzman | G06F 16/24578 707/723 |
| 2011/0119040 A1* | 5/2011 | McLennan | G06F 17/18 703/2 |
| 2012/0143861 A1* | 6/2012 | Sethi | G06Q 10/087 707/E17.014 |
| 2012/0143924 A1* | 6/2012 | Sethi | G06F 16/248 707/E17.014 |
| 2013/0030870 A1* | 1/2013 | Swinson | G06Q 30/02 705/7.35 |
| 2013/0179252 A1* | 7/2013 | Dong | G06F 16/954 706/45 |
| 2014/0317315 A1 | 10/2014 | Duchesneau | |
| 2015/0285951 A1* | 10/2015 | Rangarajan | G01V 99/005 703/10 |
| 2017/0147427 A1 | 5/2017 | Nero | |
| 2020/0111018 A1* | 4/2020 | Golovin | G06F 11/3409 |

\* cited by examiner

PREDICTIVE METHODOLOGY TO IDENTIFY POTENTIAL UNKNOWN SWEET SPOTS

BACKGROUND

As systems increase in size, finding solutions that maximize the overall design can be difficult. Further, without a systematic way to find the solutions, any solution identified may be contaminated by human bias. As example, in vehicle manufacturing, modifying one variable of the vehicle design may impact many other variables. For example, modifying the seal gap of the driver's door may impact wind noise in the vehicle, the amount of effort it takes to open and close the door, water leakage into the vehicle, among other related variables. In complex systems, humans may inject bias to solve the problems, and further may be unable to recognize the indirect impacts the solutions may have on the overall system. Accordingly, systems and techniques that provide an objective solution to complex systems are needed.

SUMMARY

In some embodiments, techniques for filtering criteria attributes based on data collected from a complex system are used to identify the sweet spot values for the criteria attributes in the complex system to assist with design and development of future complex systems. For example, existing vehicles and vehicle prototypes can be tested to obtain values used to hone in on the sweet spot for various criteria attributes of the vehicle. In some embodiments, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a computer-implemented method that includes receiving, from a measurement system, measurement values for a criteria attributes for each of multiple variants of an object (e.g., complex system such as a vehicle) being tested to generate measurement value sets, each measurement value set includes the measurement values for each of the criteria attributes for a variant of the object. The computer-implemented method also includes prioritizing the criteria attributes and accessing a data store including objective values for each of the criteria attributes for each of the variants of the object. The plurality of measurement value sets can be filtered based on the objective values for each criteria attribute of the prioritized criteria attributes using a sequential computing algorithm to identify a sweet spot for each criteria attribute for each variant of the object. Other embodiments of this aspect include corresponding computer systems, apparatus, and computer programs recorded on one or more computer storage devices, each configured to perform the actions of the methods.

Implementations may include one or more of the following features. In some embodiments, filtering the measurement value sets includes several steps for each of the prioritized criteria attributes. The steps may include removing each measurement value set having a measurement value outside the objective values for the criteria attribute, comparing each measurement value for the criteria attribute from the remaining measurement value sets against each other measurement value for each other criteria attribute using the sequential computing algorithm to identify the sweet spot, and selecting, for the next criteria attribute, from the remaining measurement value sets, the identified sweet spot. In some embodiments, the object is a vehicle. In some embodiments, the method also includes receiving, from the measurement system, second measurement values for a second subset of criteria attributes for the variants of the object being tested to generate a second subset of measurement value sets. The measurement value sets and the second measurement value sets may be filtered based at least in part on the objective values for each criteria attribute of the second subset of criteria attributes. In some embodiments, the method includes setting cross-functional variants for at least a portion of the criteria attributes in the data store. In some embodiments, at least some of the objective values include a range of objective values. The computer-implemented method where the object is a vehicle and where each variant is a sub-type of vehicle. Implementations of the described techniques may include hardware, a method or process, or computer software on a computer-accessible medium.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Complex systems often include various variables that may directly or indirectly impact each other. Finding the ideal solution or sweet spot for the many variables, particularly in a complex system, is difficult if not impossible. Described herein are techniques and systems that analyze a complex system to identify the sweet spot (i.e., optimal values or range of values) for the variables within the complex system. Specifically, the described system can identify sweet spots in a complex system in relation to variants of the complex system by analyzing live automated data sequentially to identify parallel relationships within and between the criteria attributes.

The disclosed system and techniques may be used for any type of complex system.

Throughout the description, for ease of explanation, an example system for design of a vehicle is used, which is not intended to limit the scope of the description.

To identify the sweet spot for criteria attributes (i.e., variables) within the complex system, a data source having objectively acceptable values or ranges of values for the criteria attributes for each variant of the system is generated. The identification system used to analyze the complex system to identify the sweet spot receives measurement values from a testing system that measures values of the criteria attributes from variants of the complex system and provides the measurement values to the identification system. The criteria attributes may be prioritized for determination of the sweet spot, including a selection of a value or range of values that are to be used for the most highly prioritized criteria attribute. The prioritized criteria attributes and objectively acceptable values can be used to filter the measurement values to identify the sweet spot for the variants of the complex system.

Figure 1:
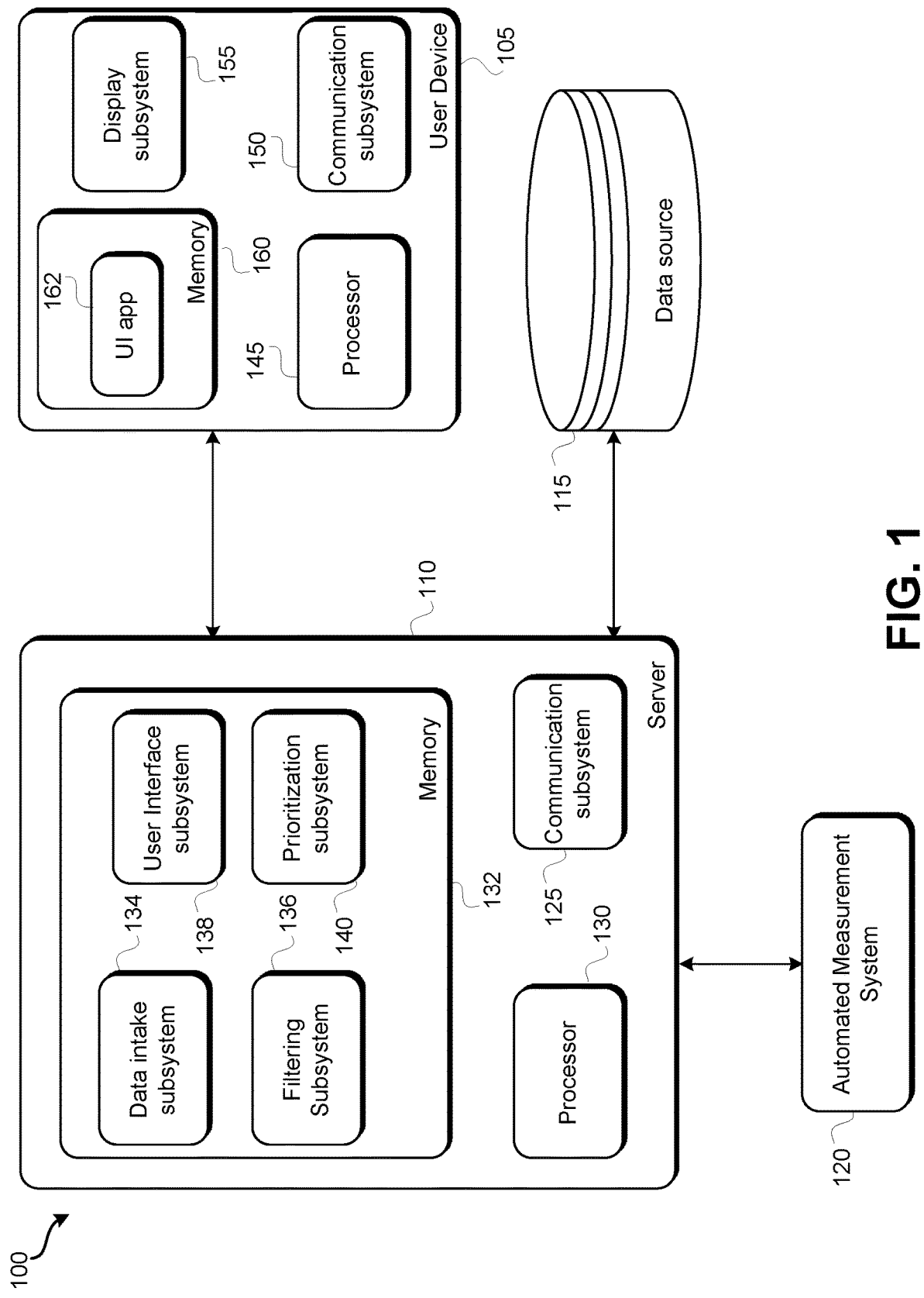
FIG. 1 illustrates an example identification system 100, according to some embodiments.

FIG. 1 illustrates an example identification system 100 for identifying the sweet spot of criteria attributes of a complex system. The identification system 100 includes a server 110, user device 105, data source 115, and automated measurement system 120. In some embodiments, more or fewer components may be included in identification system 100. For example, user device 105 may not be used and instead the results and information generated by server 110 may be viewed using a display device of server 110.

Automated measurement system 120 may be a measurement and test system that tests the attributes of variants of the complex system and provides measurements of the system. For example, a vehicle is a complex system and will be used throughout this description as an example of a complex system for which the sweet spot of the criteria attributes may be identified by the identification system 100. Automated measurement system 120 may include many different testing components for testing various attributes of the vehicles. Further, in today's manufacturing processes, many different types of vehicles (i.e., variants) are manufactured by vehicle manufacturers. As the vehicle is assembled on an assembly line, various tests are performed on the vehicle to test everything from the seal gap of the doors to the vision systems within the vehicle. Additionally, flexible manufacturing allows for vehicles of all sizes and types to be created from the same assembly line. For example, a truck with a crew cab may be followed by a truck with a short cab, which may be followed by a sedan. Each of these vehicles are tested by the automated measurement system 120 and the results are provided to the server 110.

Figure 2:
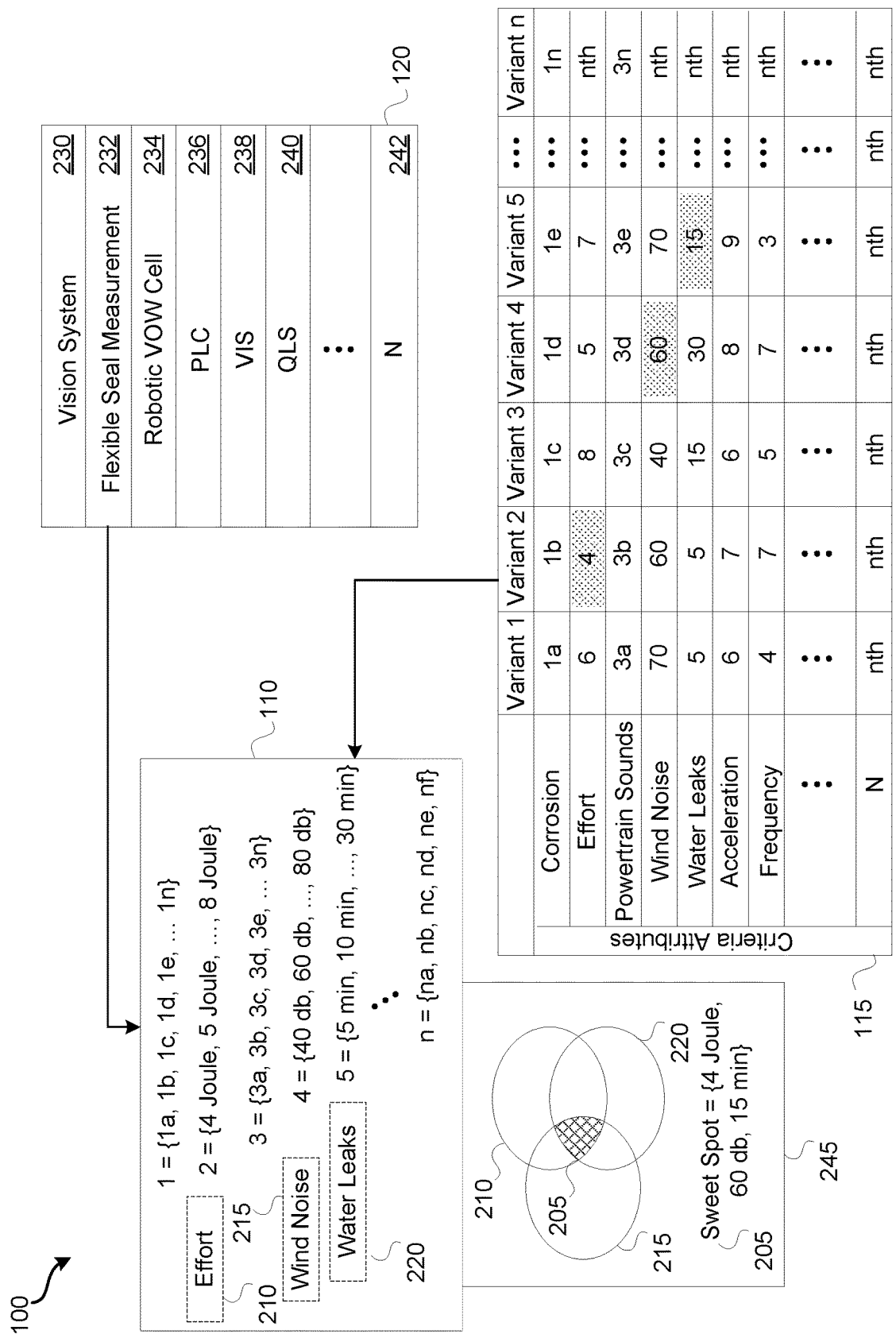
FIG. 2 illustrates another embodiment of identification system 100 with exemplary data, according to some embodiments.

Data source 115 may be any suitable database or storage device that can store data about the variants of the complex system. Initial target values (i.e., objectively acceptable values) may be generated for each criteria attribute for each variant of the complex systems. For example, a sedan and a truck may each have differing values for the target amount of effort needed to open and close the driver door. The amount of effort needed to open the driver door may be a criteria attribute. A truck may be a first variant of the complex system, and a sedan may be a second variant of the complex system (i.e., a vehicle). The data source 115 may store the objectively acceptable (target) values (or range of values) for each variant for each criteria attribute. FIG. 2 depicts some example data for data source 115. The objectively acceptable values may be initially determined by a subject matter expert. The subject matter expert may define the objectively acceptable values for the variants and criteria attributes for which the person is an expert. In some embodiments, the objectively acceptable values may be set by a computing system or imported from another system.

User device 105 includes processor 145, communication subsystem 150, display subsystem 155, and memory 160. User device 105 may be any computing device including, for example, a laptop computer, a desktop computer, a tablet, or the like, such as computing device 500 as described with respect to FIG. 5. While a single user device 105 is depicted, there may be more than one user device 105 in identification system 100. User device 105 may include additional components than those depicted for ease of description. For example, user device 105 may include components described with respect to computing device 500 of FIG. 5, such as for example, I/O 525 and bus 505. Processor 145 may execute instructions stored in memory 160 to perform the functionality described. Memory 160 may include user interface (UI) application 162. UI application 162 may provide a graphical user interface for displaying the sweet spot data generated by server 110 that are provided by user interface subsystem 138 through communication subsystems 125 and 150 to the UI application 162. Display subsystem 155 may include a display screen that is used to view the graphical user interface that may be generated for display by UI application 162 for viewing the sweet spot data generated by server 110.

Server 110 may be any server having components for performing sweet spot identification such as, for example, computing device 500. While a single server 110 is depicted, there may be more than one server 110 such as, for example in a distributed computing environment or a server farm. Server 110 may be in a cloud computing environment such as that depicted in FIG. 6. Server 110 includes a processor 130, communication subsystem 125, and memory 132. Server 110 may include additional components, such as those depicted in computing device 500, which are not shown in server 110 for ease of description. The processor 130 may execute instructions stored in memory 132 to perform the described functionality herein. Communication subsystem 125 may send and receive information to and from, for example, communication subsystem 150 of user device 105 or data source 115 using any suitable communication protocol.

Memory 132 includes data intake subsystem 134, filtering subsystem 136, user interface subsystem 138, and prioritization subsystem 140. While specific modules are described for simplicity of description and ease of the reader's understanding, the functionality described may be provided in more or fewer modules within memory 132 and server 110 without departing from the scope of the description.

Data intake subsystem 134 may receive the measurement value sets from the automated measurement system 120. For example, each variant (e.g., vehicle such as truck, sedan, crossover, and so forth) may have many tests performed to measure many different values for criteria attributes of the vehicle. The automated measurement system 120 may provide the measurement values for the variant to the data intake subsystem 134 (via the communication subsystem 125) for use. The many different values for each variant are a measurement value set associated with that variant of the complex system (e.g., vehicle). Data intake subsystem 134 may also obtain the objectively acceptable values for the criteria attributes from the data source 115. In some embodiments, the data intake subsystem 134 may have access to or be programmed with information to know which criteria attributes may be cross functional across variants such that the objectively acceptable values for certain criteria attributes for one variant may be used for a different variant. As an example, the objectively acceptable value for the effort needed to open a driver door of a crew cab truck (e.g., variant 1) may be used for the effort needed to open a driver door of a short cab truck (e.g., variant 2). However, the effort needed to open a driver door of a crew cab truck may not be acceptable to use for the effort needed to open a driver door of a sedan (e.g., variant 3). In this example, the cross functionality of the effort criteria attribute may be allowed between variant 1 and 2 but not between variant 1 and 3 or between variant 2 and 3. The allowable cross functionality may be stored within data source 115, programmed into the data intake subsystem 134, or enforced in any other suitable way.

Prioritization subsystem 140 may prioritize the criteria attributes under analysis. For example, certain criteria attributes may be determined to be more important to stay within a specific tolerance than others. Accordingly, the criteria attributes may be prioritized to be addressed by the filtering subsystem 136 in a specific order. In some embodiments, the prioritization is determined based on internal and/or external metrics. For example, warranty information may provide insight as to criteria attributes that may benefit from improvement. Additionally, external or internal survey information may be used to identify criteria attributes that may benefit from improvement. The prioritization subsystem 140 may receive the prioritization from a user via a user interface during analysis of specific criteria attributes of the complex system. In some embodiments, the measurement value sets may indicate a specific algorithm to determine which criteria attributes are being analyzed for determination of the sweet spot. The specific algorithm may include information the prioritization subsystem 140 may access to determine the prioritization and/or the criteria attributes that are to be analyzed. Prioritization subsystem 140 includes a multisystem sequential tool to manage the key critical elements from all related variances simultaneously. In some embodiments, the specific algorithm may search to find an element from key subsets, which are selected from testing subsystems in automated measurement system 120 (e.g., vision system 230, flexible seal measurement subsystem 232, and so forth). The search may be performed simultaneously in relation to criteria attributes being measured at that time by the automated measurement system 120. For example, if automated measurement system 120 is using a testing subsystem such as flexible seal measurement subsystem 232, which may be measuring criteria attributes of wind noise, effort, and water leak, those three criteria attributes may be prioritized.

Filtering subsystem 136 may use the prioritization from prioritization subsystem 140 along with the objectively acceptable values or ranges of values from the data source 115. The data flow for filtering is shown in more detail with respect to FIG. 3. The filtering subsystem 136 begins with the highest prioritized criteria attribute and filters the measurement value sets to exclude those that do not have a criteria attribute measurement value that meets the requirement set for the highest priority criteria attribute. The filtering subsystem 136 iterates through the criteria attributes in order of priority to identify from the remaining measurement value sets the best available criteria value that meets the objectively acceptable values from the data source 115 that are within the filtered measurement value sets received from the automated measurement system 120 for the variants of the complex system being analyzed. As an example, the data intake subsystem 134 may receive 50 measurement value sets for a first variant. The filtering subsystem 136 may identify the first criteria attribute from the prioritization subsystem 140 with the target sweet spot value for that criteria attribute. Initially, the filtering subsystem 136 may remove measurement sets having a value for the criteria attribute that falls outside the acceptable range from the data source 115 (i.e., outside the upper or lower specification limits). The filtering subsystem 136 then uses a sequential computer search algorithm to compare each remaining criteria attribute measurement for the criteria attribute under analysis against all other measurement values. For example, using effort as an example, all effort values remaining are compared using the sequential computer search algorithm against all wind noise values, all water leak values, and so forth, to obtain the sweet spot value for the criteria attribute under analysis. The remaining measurement value sets that do not fall within the sweet spot range for that criteria attribute may be removed. For example, perhaps 30 of the measurement value sets have a value that falls within the target sweet spot value (range) for the first criteria attribute. Those 30 measurement value sets are retained and the other 20 are removed (i.e., filtered out). The filtering subsystem 136 may then identify the second criteria attribute based on the prioritization from the prioritization subsystem. The filtering subsystem 136 may determine, from the remaining 30 measurement value sets the measurement value sets that falls within the objectively acceptable values (i.e., within the upper and lower specification limits) for the second criteria attribute according to the data source 115 information. For example, the second criteria attribute may have objectively acceptable values of 7-10. The remaining 30 measurement value sets may have second criteria values ranging from 4.1 to 13. The filtering subsystem 136 may then filter all measurement value sets from the 30 to remove any having a second criteria attribute value that falls outside of the 4.1 to 13 range. The filtering subsystem 136 then executes the sequential computer search algorithm for each criteria attribute value in the remaining measurement value sets to compare against each other measurement value in the remaining measurement value sets to obtain the sweet spot value or range for the second criteria attribute. The range may be selected based on having a narrow but sufficient range such as, for example, selecting the range based on having at least a threshold number of measurement value sets that remain after filtering for the second criteria attribute. For example, filtering subsystem 136 may be programmed to maintain at least 15 measurement value sets after filtering for the second criteria attribute. In some embodiments, filtering subsystem 136 may be programmed to maintain a percentage of measurement value sets after filtering (e.g., 50% remain after each filtering step). After removing the measurement value sets having a second criteria attribute outside the sweet spot range, the process continues with the third criteria attribute and from there continues until each criteria attribute has been isolated and a sweet spot value or range identified.

User interface subsystem 138 may generate the graphical user interface for the user to view the visualization created by filtering subsystem 136. Additionally, user interface subsystem 138 may provide a graphical user interface for the user to make selections to, for example, the prioritization of the criteria attributes, which criteria attributes to analyze, and the like. The user interface subsystem 138 may provide the graphical user interface on a display of the server 110 (not shown) or by providing the graphical user interface to the UI application 162 on user device 105 for display in display subsystem 155.

Figure 3:
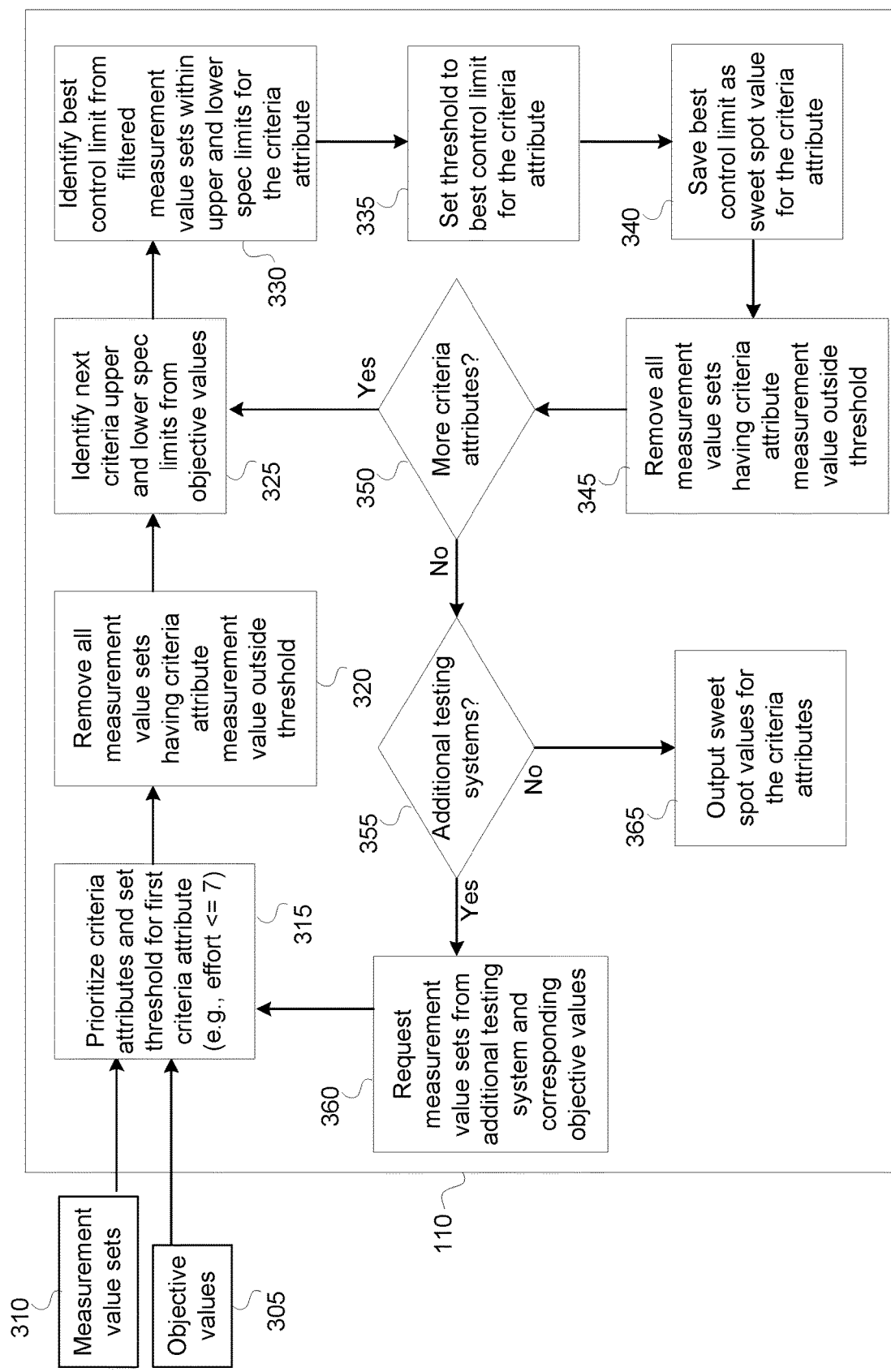
FIG. 3 illustrates an example of a logical data flow, according to some embodiments.

The following FIGS. 2 and 3 provide example data flow descriptions to help further clarify the identification system 100.

FIG. 2 illustrates identification system 100 showing exemplary data showing the identification of sweet spot 205. Automated measurement system 120 includes many different measurement subsystems including, as an example, vision system 230, flexible seal measurement system 232, robotic VOW cell 234, PLC 236, Vision inspection system (VIS) 238, Quality Leadership system (QLS) 240, and so forth through the Nth 242 test system within the automated measurement system 120. Each of the test systems within the automated measurement system 120 tests the complex system (in this example, a vehicle) for values relevant to that testing system. For example, the flexible seal measurement system 232 measures data from each vehicle relevant to the seal gap of the vehicle doors. For example, the effort that is needed to open the door, the wind noise within the vehicle, and the amount of time before water leaks in the vehicle when subjected to water. Other testing systems may measure other criteria attribute values for the vehicle. For example, other subsystems, such as QLS 240 may inspect, record, track, and vehicle repairs and VIS 238 may measure the precision and accuracy of product dimensions. Some of the criteria attributes measured by the testing systems within automated measurement system 120 may overlap. For example, other test systems may also measure the wind noise within the vehicle for other purposes.

Some or all of the test systems may perform tests on the vehicle, and the automated measurement system 120 may transmit the results from each test to the server 110. Server 110 may receive the measurement value sets (the measurement values for the criteria attributes for a single vehicle) in a data stream, for example. In some embodiments, the server 110 may store the measurement value sets in the data source 115. In some embodiments, the server 110 may store the measurement value sets in a local data store (not shown) on server 110. In some embodiments the measurement value sets for various vehicle variants are transmitted in streams that are received by the data intake subsystem 134 of server 110. In some embodiments, automated measurement system 120 may complete testing of a variant of the complex system and create an output file containing the measurement value set (i.e., results) of the testing for transmission to server 110.

The data source 115 includes an array of data that is set to include objectively acceptable values for each criteria attribute for each variant of the complex system. In this example, criteria attributes include corrosion, effort, powertrain sounds, wind noise, water leaks, acceleration, frequency, and so forth. The data source 115 may include any number of criteria attributes. Further, the value for the criteria attribute is held for each variant of the complex system. In the vehicle example used throughout, variants of a vehicle may include various types of vehicles and subtypes of the vehicles. For example, different types of vehicles may include sedan, truck, crossover, sport utility vehicle, and the like. Subtypes of the vehicles may make up other variants of the complex system including, for example, regular cab truck, super cab truck, crew cab truck, super crew cab truck, hybrid electric sedan, fully electric sedan, convertible sedan, and so forth. Each of these variants may be included in the array in data source 115. Also, some variants may have cross-functional criteria attributes across variants. For example, the effort needed to open a door may be cross-functional between different variations of a truck, but not cross-functional between a truck and a sedan. Additionally, government regulations, which may be a criteria attribute, may not be cross-functional across any variations, for example.

The server 110 receives the criteria attributes across all valid cross-functional variants for the criteria attributes to be reviewed. For example, the first criteria attribute is corrosion, and the array of objectively acceptable values are provided (i.e. 1a, 1b, and so forth). Each of the objectively acceptable values for each criteria attribute are provided to server 110. As shown the second criteria attribute, effort 210, the fourth criteria attribute, wind noise 215, and the fifth criteria attribute, water leaks 220, are being reviewed to identify the sweet spot 205. A Venn diagram is shown with the effort 210, wind noise 215, and water leaks 220 ranges to identify the sweet spot 205 in box 245. An example flow diagram in FIG. 3 illustrates the process for identifying the sweet spot 205.

FIG. 3 illustrates an exemplary logical data flow for identifying the sweet spot 205 within server 110. In some embodiments, the functionality may be implemented with a neural network or other machine learning algorithms within server 110.

Initially, the measurement value sets 310 and the objective values (i.e., objectively acceptable values) are received from the automated measurement system 120 and the data source 115, respectively. The server 110 receives the measurement value sets 310 and objective values 305 and prioritizes the criteria attributes and sets the threshold for the first criteria attribute (e.g., effort less than 7 Joules) at step 315. For example, prioritization subsystem 140 may prioritize the criteria attributes or otherwise obtain the prioritization. In some embodiments, the criteria attributes for which the sweet spot are to be identified are selected by a user with a graphical user interface. In some embodiments, a configuration module within server 110 may allow the user to configure which tests from the automated measurement system 120 should be used to collect the measurement value sets.

At step 320, the filtering subsystem 136 may remove all measurement value sets having criteria attribute measurement values outside the threshold. For example, all measurement value sets having an effort criteria attribute value greater than 7.0 Joules may be removed. The filtering subsystem 136 may then identify, at step 325 the next criteria upper and lower specification limits from the objective values. The criteria attribute upper and lower specification limits are the limits within the objectively acceptable values that bound the upper and lower acceptable values for the criteria attribute. These values, received from the data source 115, are predefined, objective, and do not change. The next criteria attribute in the prioritized list is used, and the filtering subsystem 136 identifies the best control limit from the filtered measurement value sets within the upper and lower specification limits for the criteria attribute at step 330. The best control limit may be selected from the filtered measurement value sets. For example, if the next criteria attribute is ideally a low value, the lowest value for that criteria attribute that falls within the upper and lower specification limits for that criteria attribute may be selected for the low value in a range of values that are within the sweet spot. Note that in this type of complex system, it may be difficult to pinpoint a single value, and a range of values may be used as the sweet spot for any given criteria attribute.

Referring back to FIG. 2 for exemplary data, the effort criteria attribute may be set at 4 Joules. For the second criteria attribute, wind noise 215, the lower specification limit is 40 db (decibels) and the upper specification limit is 80 db as shown. The measurement value sets having effort of 4 Joules may have a lowest wind noise value of 60 db. Accordingly, the lower control limit for wind noise of 60 db is selected as the best within those vehicles having an effort of 4 Joules.

Returning to FIG. 3, at step 335 the filtering subsystem 136 may set the threshold to the best control limit for the criteria attribute. In the example above, the threshold may be set at 60 db. In some embodiments, to ensure that sufficient other measurement value sets are included, a range of values may be used as the threshold. For example, a range of 60-70 db may include enough remaining measurement value sets to continue with the algorithm. For example, the range may be selected to keep a specific number or percentage of the measurement value sets.

At step 340, the best control limit or threshold value selected at step 335 is saved as the sweet spot value for the criteria attribute. In the example of wind noise, the range of 60 db-70 db may be set as the sweet spot range for the variant of vehicle being analyzed. At step 345, the filtering subsystem 136 removes all measurement value sets having criteria attribute measurement values outside the threshold or range. For example, a measurement value set having a wind noise value of 73.2 db is removed, and a measurement value set having a wind noise of 61.3 db is retained.

At step 350, the filtering subsystem 136 determines if there are more criteria attributes to analyze. If so, the process continues at step 325 with the filtering subsystem 136 identifying the next criteria attribute upper and lower specification limits from the objective values. This process may continue until there are no further criteria attributes. If at step 350 the filtering subsystem 136 determines if there are no more criteria attributes, the filtering subsystem 136 may determine if there are additional testing systems. For example, as shown in FIG. 2, the flexible seal measurement system 232 may provide a first set of measurement value sets, and the PLC 236 may provide a different set of measurement value sets. In some embodiments, the measurement value sets may be received and analyzed individually. In some embodiments, the measurement value sets may be received or requested together such that the criteria attributes across various testing systems may be used to identify the sweet spots for the criteria attributes that may be indirectly related to each other.

If there are additional testing systems to access, at step 360 the filtering subsystem 136 requests the measurement value sets from the automated measurement system 120 from any testing components needed. In some embodiments, the testing systems are determined based on the criteria attribute or the component that is under analysis. For example, a table indicating which testing systems to access for each component or criteria attribute may be stored within memory of server 110 or in data source 115. Filtering subsystem 136 also requests the objective values 305 from the data source 115. The filtering subsystem 136 then prioritizes the criteria attributes at step 315 and the process continues.

If there are no other testing systems, at step 365, the server 110 outputs sweet spot values for the criteria attributes that were saved. The server 110 can send the sweet spot values to an output or display device on the server 110 or to the user device 105 for display with display subsystem 155.

Figure 4:
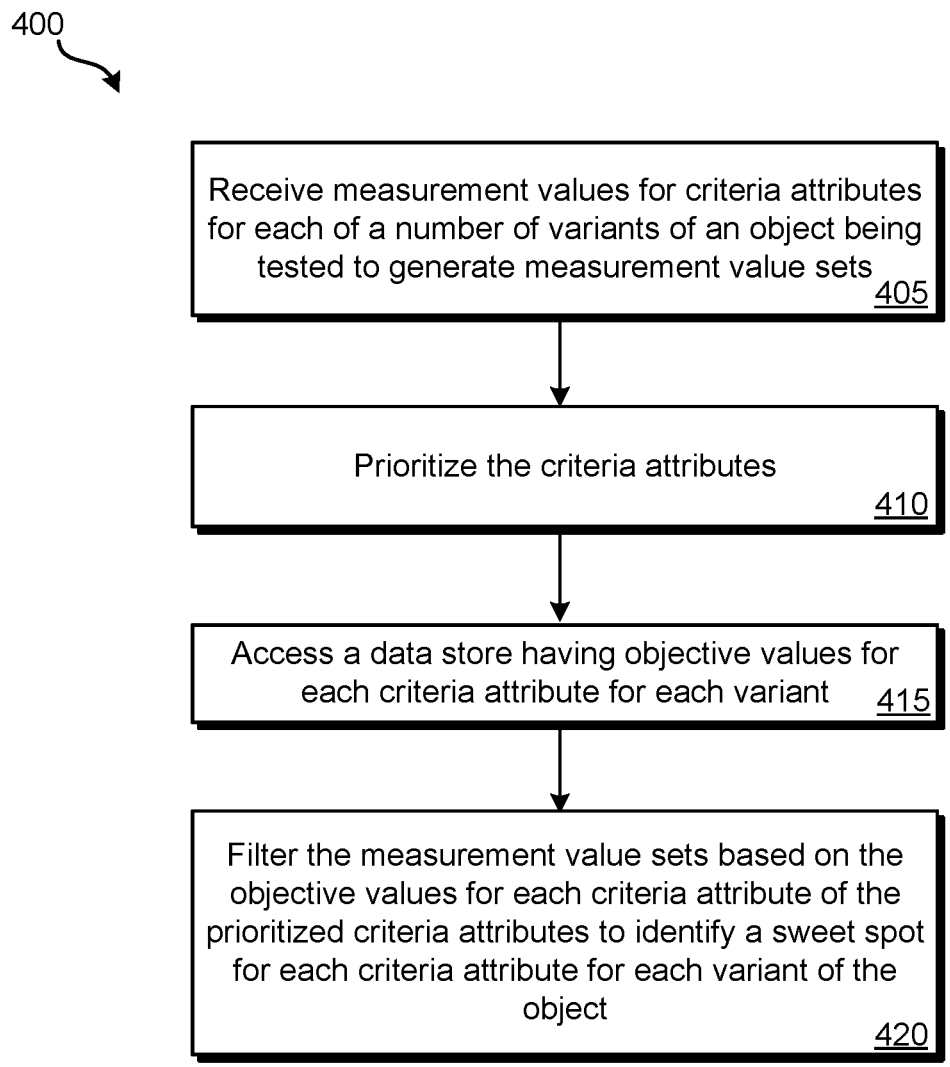
FIG. 4 illustrates a method, according to some embodiments.

FIG. 4 illustrates a method 400 for identifying sweet spots of criteria attributes for a complex system. Method 400 may be performed by any computer system such as, for example, server 110. Method 400 begins at step 405 with receiving measurement values for criteria attributes for each of a number of variants of an object being tested to generate measurement value sets. For example, data intake subsystem 134 receives measurement value sets from automated measurement system 120 for variants of a complex system being tested. As an example, a vehicle is a complex system and variants include a sedan, a truck, and subsets of the types of vehicles including, for example, a regular cab truck, a super cab truck, a hybrid electric sedan, a convertible sedan, and so forth. The system may receive measurement test sets for many different variants, and the variants of the same subtype are pooled to make determinations about the sweet spot values for that particular variant. For example, the measurement value sets for the super cab trucks are pooled and the measurement value sets for the convertible sedans are pooled and each pool of measurement value sets are used to determine the sweet spot values for that variant of the complex system.

At step 410, the criteria attributes are prioritized. For example, prioritization subsystem 140 may prioritize the criteria attributes for which the server 110 received measurement value sets having values and that are to be analyzed for a sweet spot. In some embodiments, the prioritization is set by a user using a graphical user interface. In some embodiments, the prioritization is set in a testing algorithm that may define the measurement test sets that are to be obtained and from which testing features of the automated measurement system 120.

At step 415, the data store is accessed which has objective values for each criteria attribute for each variant. For example, data source 115 may be accessed to obtain the objectively acceptable value for each criteria attribute for each variant. As shown in FIG. 2, the data source may include an array having a value or range of values for each criteria attribute (e.g., effort, wind noise, and so forth) for each variant (e.g., vehicle type and subtype). These objectively acceptable values or range of values are used as the upper and lower specification limits for the criteria attribute for the variants being reviewed.

At step 420, the measurement value sets are filtered based on the objective values for each criteria attribute of the prioritized criteria attributes to identify a sweet spot for each criteria attribute for each variant of the object. For example, the filtering subsystem 136 may filter the measurement test sets as described in detail with respect to FIG. 3. Once filtered and the sweet spot values or range of values for each criteria attribute are saved, the sweet spot values may be provided to the user via a graphical user interface. In some embodiments, the sweet spot values may be used to adjust manufacturing of the complex system to generate variants that have criteria attribute values that land within the sweet spot for that criteria attribute for that variant.

Examples of Computing Environments for Implementing Certain Embodiments

Figure 5:
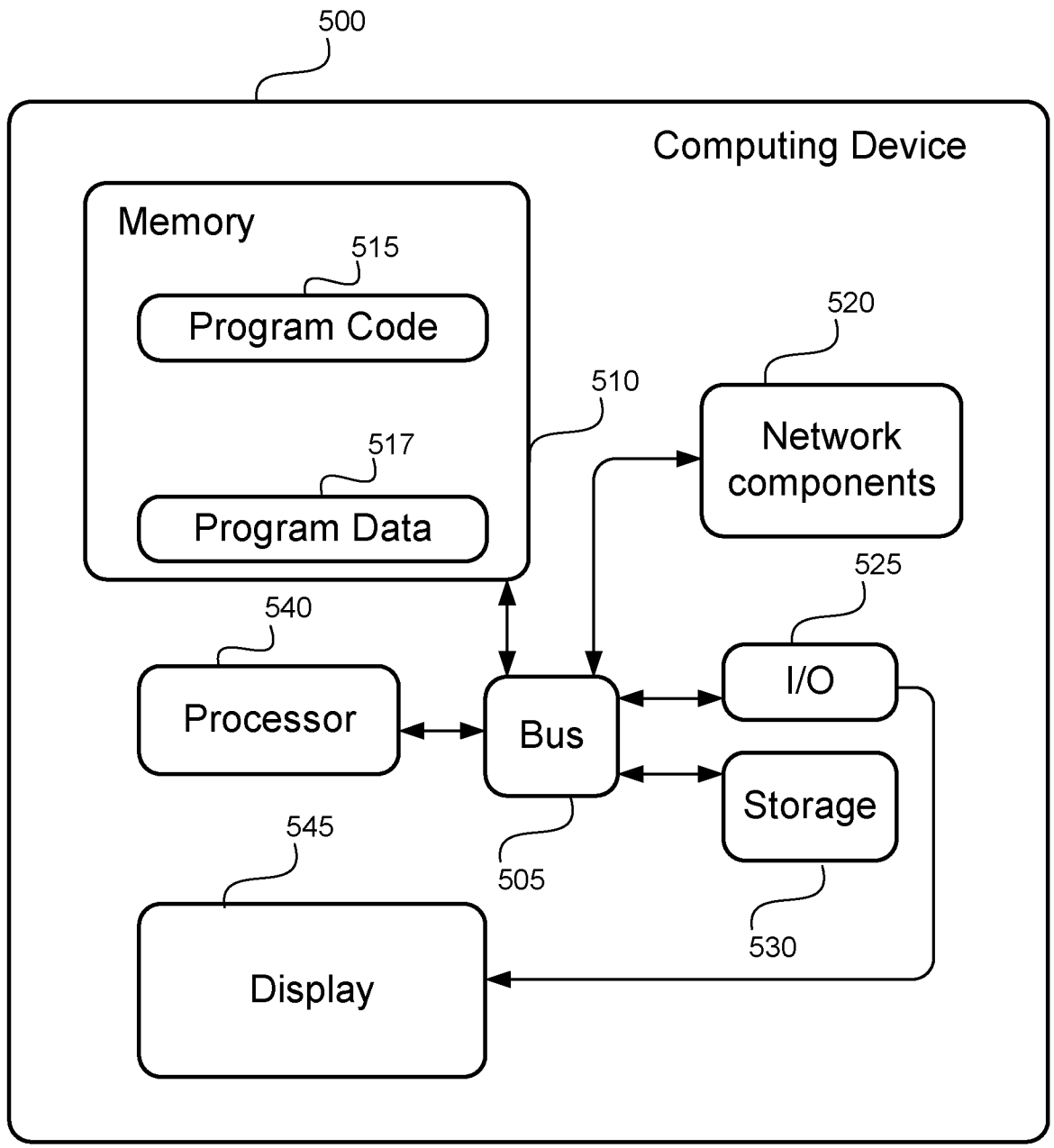
FIG. 5 illustrates a computer system, according to some embodiments.
Figure 6:
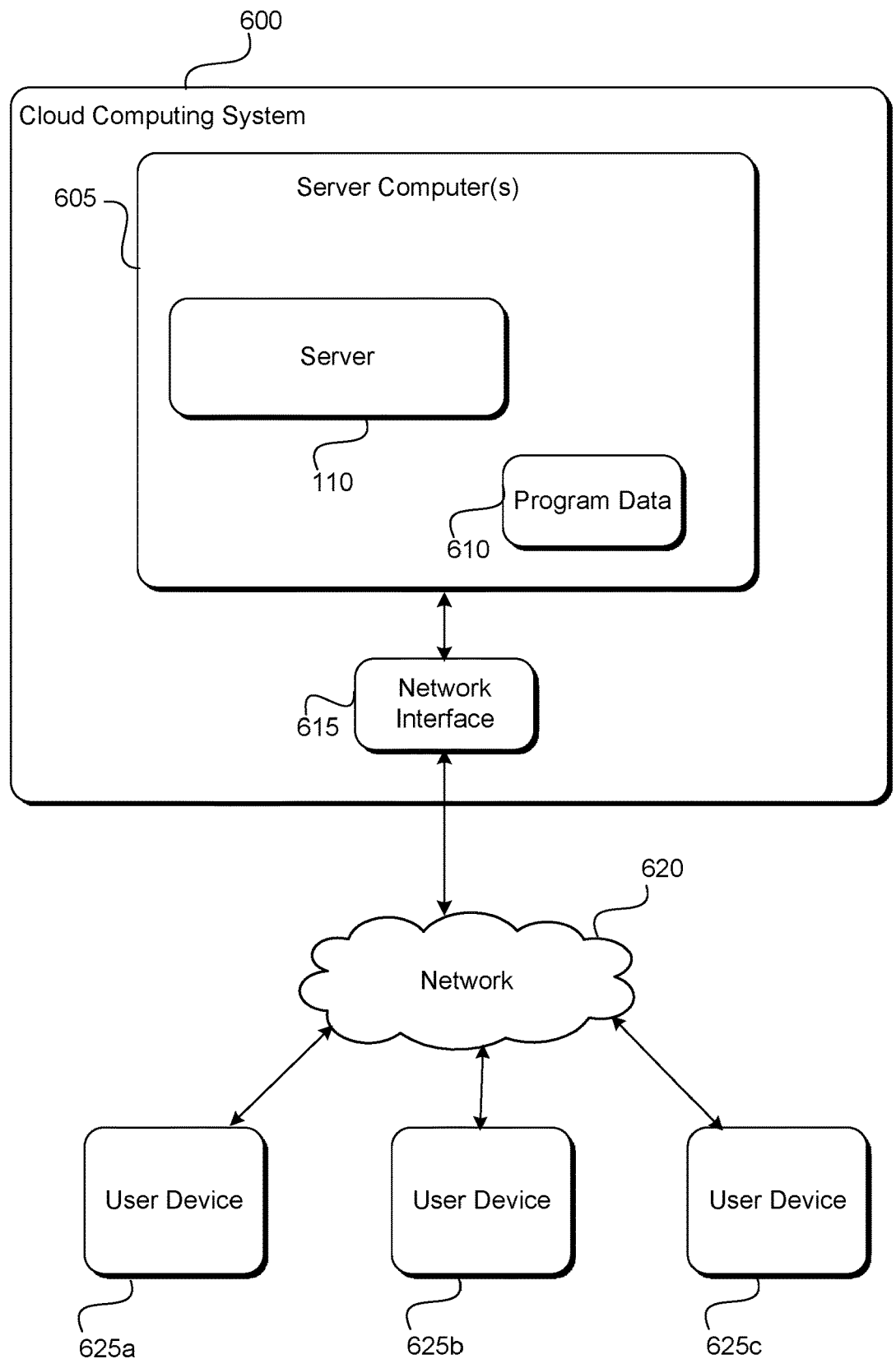
FIG. 6 illustrates a cloud computing system, according to some embodiments.

Any suitable computing system or group of computing systems can be used for performing the operations described herein. For example, FIG. 6 illustrates a cloud computing system 600 by which at least a portion of the functionality of server 110 may be offered. FIG. 5 depicts an example of a computing device 500 that may be at least a portion of user device 105 and/or server 110. The implementation of the computing device 500 could be used for one or more of the subsystems depicted in FIG. 1. In an embodiment, a single user device 105 or server 110 having devices similar to those depicted in FIG. 5 (e.g., a processor, a memory, etc.) combines the one or more operations and data stores depicted as separate subsystems in FIG. 1.

FIG. 5 illustrates a block diagram of an example of a computer system 500. Computer system 500 can be any of the described computers herein including, for example, server 110 or user device 105. The computing device 500 can be or include, for example, an integrated computer, a laptop computer, desktop computer, tablet, server, or other electronic device.

The computing device 500 can include a processor 540 interfaced with other hardware via a bus 505. A memory 510, which can include any suitable tangible (and non-transitory) computer readable medium, such as RAM, ROM, EEPROM, or the like, can embody program components (e.g., program code 515) that configure operation of the computing device 500. Memory 510 can store the program code 515, program data 517, or both. In some examples, the computing device 500 can include input/output ("I/O") interface components 525 (e.g., for interfacing with a display 545, keyboard, mouse, and the like) and additional storage 530.

The computing device 500 executes program code 515 that configures the processor 540 to perform one or more of the operations described herein. Examples of the program code 515 include, in various embodiments, data intake subsystem 134, filtering subsystem 136, user interface subsystem 138, prioritization subsystem 140, or any other suitable systems or subsystems that perform one or more operations described herein (e.g., one or more development systems for configuring an interactive user interface). The program code 515 may be resident in the memory 510 or any suitable computer-readable medium and may be executed by the processor 540 or any other suitable processor.

The computing device 500 may generate or receive program data 517 by virtue of executing the program code 515. For example, the measurement value sets and objectively acceptable values are all examples of program data 517 that may be used by the computing device 500 during execution of the program code 515.

The computing device 500 can include network components 520. Network components 520 can represent one or more of any components that facilitate a network connection. In some examples, the network components 520 can facilitate a wireless connection and include wireless interfaces such as IEEE 802.11, Bluetooth, or radio interfaces for accessing cellular telephone networks (e.g., a transceiver/antenna for accessing CDMA, GSM, UMTS, or other mobile communications network). In other examples, the network components 520 can be wired and can include interfaces such as Ethernet, USB, or IEEE 1394.

Although FIG. 5 depicts a single computing device 500 with a single processor 540, the system can include any number of computing devices 500 and any number of processors 540. For example, multiple computing devices 500 or multiple processors 540 can be distributed over a wired or wireless network (e.g., a Wide Area Network, Local Area Network, or the Internet). The multiple computing devices 500 or multiple processors 540 can perform any of the steps of the present disclosure individually or in coordination with one another.

In some embodiments, the functionality provided by the identification system 100 may be offered as cloud services by a cloud service provider. For example, FIG. 6 depicts an example of a cloud computing system 600 offering an identification service that can be used by a number of user subscribers using user devices 625a, 625b, and 625c across a data network 620. User devices 625a, 625b, and 625c could be examples of a user device 105 described above. In the example, the identification service may be offered under a Software as a Service (SaaS) model. One or more users may subscribe to the identification service, and the cloud computing system performs the processing to provide the identification service to subscribers. The cloud computing system may include one or more remote server computers 605.

The remote server computers 605 include any suitable non-transitory computer-readable medium for storing program code (e.g., server 110) and program data 610, or both, which is used by the cloud computing system 600 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 605 can include volatile memory, non-volatile memory, or a combination thereof.

One or more of the servers 605 execute the program code 610 that configures one or more processors of the server computers 605 to perform one or more of the operations that provide identification services, including the ability to utilize the data intake subsystem 134, filtering subsystem 136, user interface subsystem 138, prioritization subsystem 140, and so forth, to perform identification services. As depicted in the embodiment in FIG. 6, the one or more servers 605 provide the services to perform identification services via the server 110. Any other suitable systems or subsystems that perform one or more operations described herein (e.g., one or more development systems for configuring an interactive user interface) can also be implemented by the cloud computing system 600.

In certain embodiments, the cloud computing system 600 may implement the services by executing program code and/or using program data 610, which may be resident in a memory device of the server computers 605 or any suitable computer-readable medium and may be executed by the processors of the server computers 605 or any other suitable processor.

In some embodiments, the program data 610 includes one or more datasets and models described herein. Examples of these datasets include measurement value sets and objectively acceptable values, etc. In some embodiments, one or more of data sets, models, and functions are stored in the same memory device. In additional or alternative embodiments, one or more of the programs, data sets, models, and functions described herein are stored in different memory devices accessible via the data network 615.

The cloud computing system 600 also includes a network interface device 615 that enable communications to and from cloud computing system 600. In certain embodiments, the network interface device 615 includes any device or group of devices suitable for establishing a wired or wireless data connection to the data networks 620. Non-limiting examples of the network interface device 615 include an Ethernet network adapter, a modem, and/or the like. The server 110 is able to communicate with the user devices 625a, 625b, and 625c via the data network 620 using the network interface device 615.

General Considerations

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

What is claimed is:

1. A computer-implemented method, comprising:
receiving, from a measurement system, measurement values for a subset of a plurality of criteria attributes for each of a subset of a plurality of variants of an object being tested to generate a plurality of measurement value sets, each measurement value set comprising the measurement values for each of the subset of criteria attributes for a variant of the plurality of variants of the object;
prioritizing the subset of criteria attributes;
accessing a data store comprising objective values for each of the plurality of criteria attributes for each of the plurality of variants of the object;
setting cross-functional variants for at least a portion of the plurality of criteria attributes in the data store;
filtering the plurality of measurement value sets based on the objective values for each criteria attribute of the prioritized subset of criteria attributes;
for each criteria attribute among the filtered prioritized subset of criteria attributes:
compare the criteria attribute against other criteria attributes in the filtered prioritized subset of criteria attributes using a sequential computing algorithm to identify parallel relationships within and between the filtered prioritized subset of criteria attributes; and
identify a sweet spot for each criteria attribute in the filtered prioritized subset of criteria attributes for each variant of the object based on the identified parallel relationships.

2. The computer-implemented method of claim 1, further comprising:
for each of the prioritized subset of criteria attributes:
removing each measurement value set from the plurality of measurement value sets having a measurement value outside the objective values for the criteria attribute; and
selecting, for the next criteria attribute, from the remaining plurality of measurement value sets, the identified sweet spot.

3. The computer-implemented method of claim 1, wherein the object is a vehicle.

4. The computer-implemented method of claim 1, further comprising:
receiving, from the measurement system, second measurement values for a second subset of the plurality of criteria attributes for the subset of the plurality of variants of the object being tested to generate a second plurality of measurement value sets; and
filtering the plurality of measurement value sets and the second plurality of measurement value sets based at least in part on the objective values for each criteria attribute of the second subset of criteria attributes.

5. The computer-implemented method of claim 1, wherein at least some of the objective values comprise a range of objective values.

6. The computer-implemented method of claim 1, wherein the object is a vehicle and wherein each variant is a sub-type of vehicle.

7. The computer-implemented method of claim 1, wherein the method is implemented using a machine learning algorithm.

8. The computer-implemented method of claim 1, wherein manufacturing of the object is adjusted based on the sweet spot for each criteria attribute to generate variants that have criteria attribute values within the sweet spot for that criteria attribute for that variant.

9. A system, comprising:
one or more processors; and
a memory having stored thereon instructions that, when executed by the one or more processors, cause the one or more processors to:
receive, from a measurement system, measurement values for a subset of a plurality of criteria attributes for each of a subset of a plurality of variants of an object being tested to generate a plurality of measurement value sets, each measurement value set comprising the measurement values for each of the subset of criteria attributes for a variant of the plurality of variants of the object;

prioritize the subset of criteria attributes;

access a data store comprising objective values for each of the plurality of criteria attributes for each of the plurality of variants of the object; and set cross-functional variants for at least a portion of the plurality of criteria attributes in the data store;

filter the plurality of measurement value sets based on the objective values for each criteria attribute of the prioritized subset of criteria attributes;

for each criteria attribute among the filtered prioritized subset of criteria attributes:

compare the criteria attribute against other criteria attributes in the filtered prioritized subset of criteria attributes using a sequential computing algorithm to identify parallel relationships within and between the filtered prioritized subset of criteria attributes; and identify a sweet spot for each criteria attribute in the filtered prioritized subset of criteria attributes for each variant of the object based on the identified parallel relationships.

10. The system of claim 9, wherein the instructions comprise further instructions that, when executed by the one or more processors, cause the one or more processors to: for each of the prioritized subset of criteria attributes:

remove each measurement value set from the plurality of measurement value sets having a measurement value outside the objective values for the criteria attribute; and select, for the next criteria attribute, from the remaining plurality of measurement value sets, the identified sweet spot.

11. The system of claim 9, wherein the object is a vehicle.

12. The system of claim 9, wherein the instructions comprise further instructions that, when executed by the one or more processors, cause the one or more processors to:

receive, from the measurement system, second measurement values for a second subset of the plurality of criteria attributes for the subset of the plurality of variants of the object being tested to generate a second plurality of measurement value sets; and filter the plurality of measurement value sets and the second plurality of measurement value sets based at least in part on the objective values for each criteria attribute of the second subset of criteria attributes.

13. The system of claim 9, wherein at least some of the objective values comprise a range of objective values.

14. The system of claim 9, wherein the object is a vehicle and wherein each variant is a sub-type of vehicle.

15. A non-transitory memory device having stored thereon instructions that, when executed by one or more processors, cause the one or more processors to:

receive, from a measurement system, measurement values for a subset of a plurality of criteria attributes for each of a subset of a plurality of variants of an object being tested to generate a plurality of measurement value sets, each measurement value set comprising the measurement values for each of the subset of criteria attributes for a variant of the plurality of variants of the object;

prioritize the subset of criteria attributes;

access a data store comprising objective values for each of the plurality of criteria attributes for each of the plurality of variants of the object; and set cross-functional variants for at least a portion of the plurality of criteria attributes in the data store;

filter the plurality of measurement value sets based on the objective values for each criteria attribute of the prioritized subset of criteria attributes;

for each criteria attribute among the filtered prioritized subset of criteria attributes:

compare the criteria attribute against other criteria attributes in the filtered prioritized subset of criteria attributes using a sequential computing algorithm to identify parallel relationships within and between the filtered prioritized subset of criteria attributes; and identify a sweet spot for each criteria attribute in the filtered prioritized subset of criteria attributes for each variant of the object based on the identified parallel relationships.

16. The non-transitory memory device of claim 15, wherein the instructions comprise further instructions that, when executed by the one or more processors, cause the one or more processors to:

for each of the prioritized subset of criteria attributes:

remove each measurement value set from the plurality of measurement value sets having a measurement value outside the objective values for the criteria attribute; and select, for the next criteria attribute, from the remaining plurality of measurement value sets, the identified sweet spot.

17. The non-transitory memory device of claim 15, wherein the object is a vehicle.

18. The non-transitory memory device of claim 15, wherein the instructions comprise further instructions that, when executed by the one or more processors, cause the one or more processors to:

receive, from the measurement system, second measurement values for a second subset of the plurality of criteria attributes for the subset of the plurality of variants of the object being tested to generate a second plurality of measurement value sets; and filter the plurality of measurement value sets and the second plurality of measurement value sets based at least in part on the objective values for each criteria attribute of the second subset of criteria attributes.

19. The non-transitory memory device of claim 15, wherein at least some of the objective values comprise a range of objective values.

* * * * *